(12) United States Patent
Boland et al.

(10) Patent No.: US 8,171,451 B2
(45) Date of Patent: May 1, 2012

(54) PROVIDING REPORTS AS WEB SERVICES

(75) Inventors: Jim Boland, Kanata (CA); Wade Williams, Kanata (CA); Wayne Salter, Ashton (CA)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 12/117,996

(22) Filed: May 9, 2008

(65) Prior Publication Data

US 2009/0282385 A1    Nov. 12, 2009

(51) Int. Cl.
*G06F 9/44*    (2006.01)
(52) U.S. Cl. .......................................... 717/106; 709/206
(58) Field of Classification Search ................... 717/104, 717/108, 114; 719/332; 709/206
See application file for complete search history.

(56) References Cited

U.S. PATENT DOCUMENTS

| | | | | |
|---|---|---|---|---|
| 7,318,083 | B2* | 1/2008 | Senda | 709/203 |
| 7,792,952 | B2* | 9/2010 | Howard et al. | 709/224 |
| 2003/0055890 | A1* | 3/2003 | Senda | 709/203 |
| 2004/0139151 | A1* | 7/2004 | Flurry et al. | 709/203 |
| 2004/0210631 | A1* | 10/2004 | Asher et al. | 709/203 |
| 2004/0225603 | A1* | 11/2004 | Allen et al. | 705/39 |
| 2005/0080661 | A1* | 4/2005 | Casati et al. | 705/10 |
| 2006/0004745 | A1* | 1/2006 | Kuhn et al. | 707/4 |
| 2006/0015523 | A1* | 1/2006 | Dick et al. | 707/102 |
| 2007/0006124 | A1* | 1/2007 | Ahmed et al. | 717/101 |
| 2007/0118844 | A1* | 5/2007 | Huang et al. | 719/330 |
| 2007/0150862 | A1* | 6/2007 | Naibo et al. | 717/110 |
| 2008/0243631 | A1* | 10/2008 | Kane et al. | 705/26 |
| 2009/0106371 | A1* | 4/2009 | Schmidt-Karaca et al. | 709/206 |

* cited by examiner

*Primary Examiner* — Hung T Vy
*Assistant Examiner* — Mongbao Nguyen
(74) *Attorney, Agent, or Firm* — Stephen J. Walder, Jr.; Erin C. Ming

(57) ABSTRACT

A report web service system comprises a web service interface, a report service manager, and a Web Services Description Language (WSDL) generator. The web service interface receives from a Client Application a request for a web service definition for a report as a web service, and transports to the client application the requested web service definition. The report service manager converts definitions of one or more objects in a report definition in a report store that corresponds to the requested report into web service definitions, and generates an object model based on the web service definitions to reflect a structure of the objects of the report. The WSDL generator generates a WSDL definition for the web service based on the object model. When a report as defined in the WSDL definition is rendered, a selector selects relevant objects from a generalized model of the rendered results based on information in the WSDL definition, and a representation formatter formats representation of the relevant objects.

25 Claims, 12 Drawing Sheets

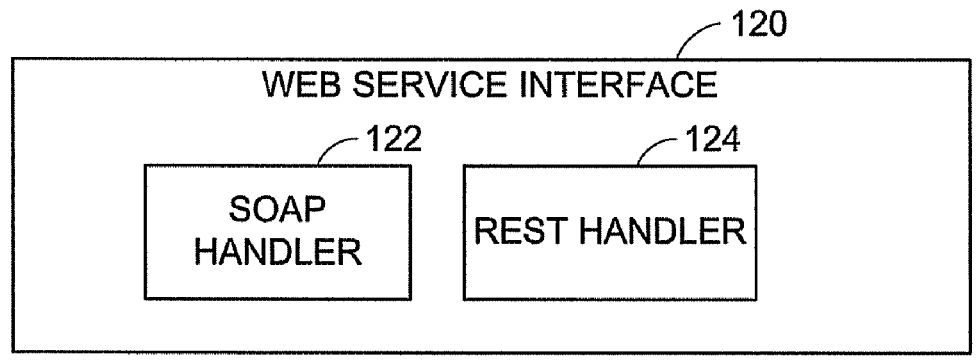
Figure 4
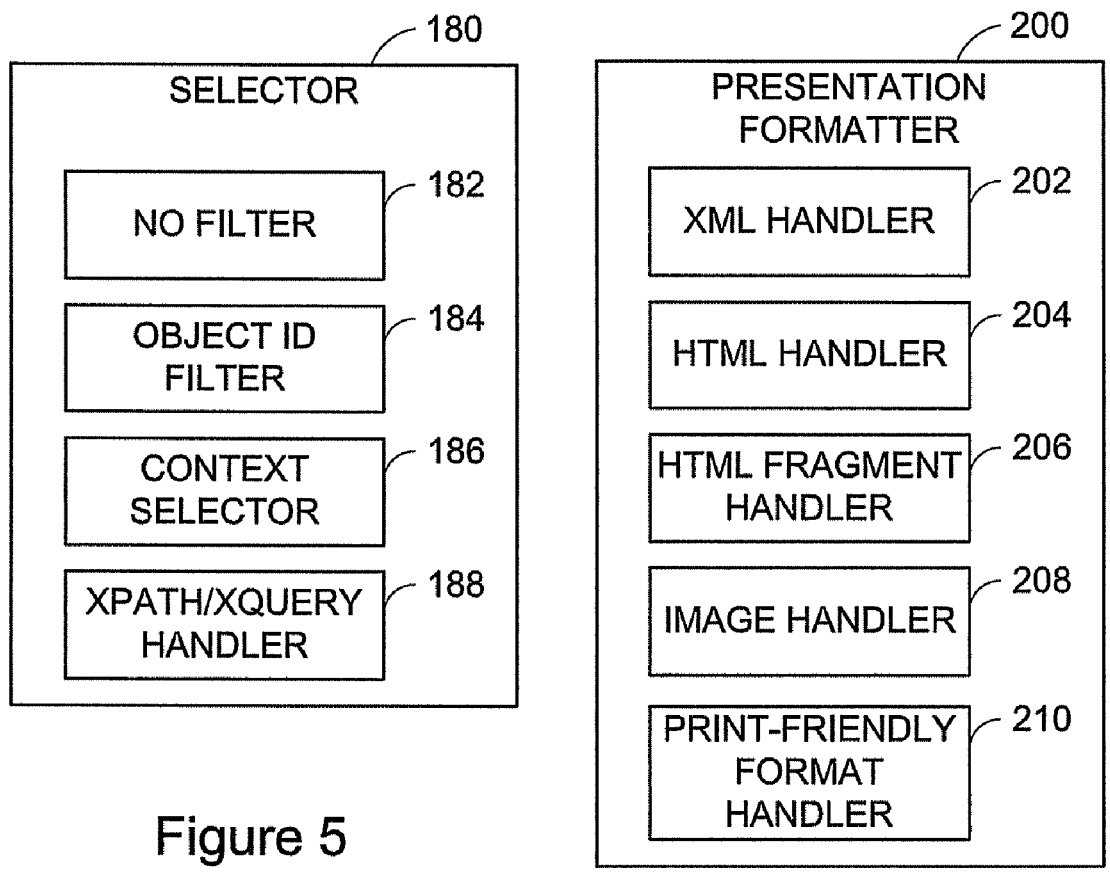
Figure 5
Figure 6

```xml
<?xml version="1.0" encoding="UTF-8" ?>
<inspection xmlns="http://schemas.xmlsoap.org/ws/2001/10/inspection/"
    xmlns:wsilwsdl="http://schemas.xmlsoap.org/ws/2001/10/inspection/wsdl/">
  <link referencedNamespace="http://schemas.xmlsoap.org/ws/2001/10/inspection/"
      location="http://wottbolandjxp1:80/mr1/cgi-bin/cognos.cgi/rds/
      wsil?searchPath=%2Fcontent%2Fpackage%5B%40name%3D%27GO+Sales%27%5D%
      2Ffolder%5B%40name%3D%27Event+Studio+Samples%27%5D&type.wsil">
    <abstract>Event Studio Samples</abstract>
  </link>
  <link referencedNamespace="http://schemas.xmlsoap.org/ws/2001/10/inspection/"
      location="http://wottbolandjxp1:80/mr1/cgi-bin/cognos.cgi/rds/
      wsil?searchPath=%2Fcontent%2Fpackage%5B%40name%3D%27GO+Sales%27%5D%
      2Ffolder%5B%40name%3D%27GO+Template+Samples%27%5D&type.wsil">
    <abstract>GO Template Samples</abstract>
  </link>
  <link referencedNamespace="http://schemas.xmlsoap.org/ws/2001/10/inspection/"
      location="http://wottbolandjxp1:80/mr1/cgi-bin/cognos.cgi/rds/
      wsil?searchPath=%2Fcontent%2Fpackage%5B%40name%3D%27GO+Sales%27%5D%
      2Ffolder%5B%40name%3D%27Query+Studio+Report+Samples%27%5D&type.wsil">
    <abstract>Query Studio Report Samples</abstract>
  </link>
  <link referencedNamespace="http://schemas.xmlsoap.org/ws/2001/10/inspection/"
      location="http://wottbolandjxp1:80/mr1/cgi-bin/cognos.cgi/rds/
      wsil?searchPath=%2Fcontent%2Fpackage%5B%40name%3D%27GO+Sales%27%5D%
      2Ffolder%5B%40name%3D%27Report+Studio+Report+Samples%27%5D&type.wsil">
    <abstract>Report Studio Report Samples</abstract>
  </link>
  <service>
    <name>Sales Results Report</name>
    <abstract>Cognos8 Content service</abstract>
    <description referencedNamespace="http://schemas.xmlsoap.org/wsdl/" location="http://
        wottbolandjxp1:80/mr1/cgi-bin/cognos.cgi/rds/
        wsdl?searchPath=%2Fcontent%2Fpackage%5B%40name%3D%27GO+Sales%27%5D
        %2Freport%5B%40name%3D%27Sales+Results+Report%27%5D" />
  </service>
  <service>
    <name>somereport</name>
    <abstract>Cognos8 Content service</abstract>
    <description referencedNamespace="http://schemas.xmlsoap.org/wsdl/" location="http://
        wottbolandjxp1:80/mr1/cgi-bin/cognos.cgi/rds/
        wsdl?searchPath=%2Fcontent%2Fpackage%5B%40name%3D%27GO+Sales%27%5D
        %2Fquery%5B%40name%3D%27somereport%27%5D" />
  </service>
</inspection>
```

Figure 15

PROVIDING REPORTS AS WEB SERVICES

FIELD OF THE INVENTION

The present invention relates to a method of and system for providing reports as web services.

BACKGROUND OF THE INVENTION

There exist reporting tools that generate reports from underlying data sources. Typically, these reporting tools have mechanisms to render the report result in visually accessible formats (such as HTML and PDF). To access the report results programmatically, these reporting tools have mechanisms to obtain the results of rendering of a report in the form of a homogenous set of rows with many columns in some format, e.g., Comma-Separated Values or XML. Those rows need to be parsed to understand the context and meaning of each individual cell in the unstructured table of data. Each column has specific meaning and is position dependent. Important information about the data like group breaks often needs to be detected by parsing the data and maintaining state information from row to row.

Such parsing needs extensive programming and is prone to errors. It is also fragile and can easily be broken, for example, by common report maintenance activities, such as adding new data columns to the report.

As well, these programmatically accessible "tabular data" formats only capture the raw data values, and do not capturing the presentation properties (e.g., layout and formatting) of the report, that represent a large part of the Business Intelligence report rendering application's value.

Conversely, formats such as HTML and PDF are commonly generated from these reporting tools, formats of which do capture this presentation information. However, these formats are not structured in a format which allows the output to be used in other contexts programmatically (without the previously mentioned complexity and fragility).

It is therefore desirable to provide a mechanism that can provide programmatic access to report results with presentation properties without requiring such complex parsing.

SUMMARY OF THE INVENTION

It is an object of the invention to provide a mechanism that provides reports as web services.

The invention uses a mechanism that dynamically generates an object model of a report that reflects layout information of the report as authored.

In accordance with an aspect of the present invention, there is provided a report web service system comprising a web service interface, a report service manager, and a Web Services Description Language (WSDL) generator. The web service interface is provided for receiving from a client application a request for a web service definition for a report as a web service, and transporting to the client application the requested web service definition. The report service manager is provided for converting definitions of one or more objects in a report in a report store that corresponds to the requested report into web service definitions, and generating an object model based on the web service definitions to reflect a structure of the objects of the report. The WSDL generator is provided for generating a WSDL definition for the web service based on the object model, and providing the WSDL definition to the web service interface for transporting it to the client application.

In accordance with to another aspect of the invention, the web service interface receives from the client application a request for rendering a selected report as defined by a WSDL definition of the selected report, and transports a report content of the selected report to the client application. The report service manager requests rendering of the selected report, receives rendered results, and generates a generalized model of the rendered results. The report web service system further comprises a selector and a representation formatter. The selector is provided for selecting relevant objects from the generalized model based on information in the WSDL definition. The representation formatter is provided for formatting representation of the relevant objects and for providing a formatted objects to the web service interface to return to the client application as the requested report content of the selected report.

In accordance with to another aspect of the invention, there is provided a method of managing report web services. The method comprises the steps of receiving from a client application a request for a web service definition for a report as a web service; converting definitions of one or more objects in a report definition in a report store that corresponds to the requested report into web service definitions; generating an object model based on the web service definition to reflect a structure of the objects of the report; generating a WSDL definition for the web service based on the object model; and transporting the WSDL definition to the client application.

In accordance with to another aspect of the invention, the method further comprises the steps of receiving from the client application a request for rendering a selected report as defined by the WSDL definition; requesting rendering of the selected report; receiving rendered results; generates a generalized model of the rendered results; selecting relevant objects from the generalized model based on information in the WSDL definition; formatting representation of the relevant objects; and transporting the formatted objects to the client application as the requested report content of the selected report.

In accordance with to another aspect of the invention, there is provided a computer readable medium storing instructions or statements for use in the execution in a computer of a method of managing report web services. The method comprises the steps of receiving from a client application a request for a web service definition for a report as a web service; converting definitions of one or more objects in a report in a report store that corresponds to the requested report into web service definitions; generating an object model based on the web service definitions to reflect a structure of the objects of the report; generating a WSDL definition for the web service based on the object model; and transporting the WSDL definition to the client application. The method may further comprise the steps of receiving from the client application a request for rendering a selected report as defined by the WSDL definition; requesting rendering of the selected report; receiving rendered results; generates a generalized model of the rendered results; selecting relevant objects from the generalized model based on information in the WSDL definition; formatting representation of the relevant objects; and transporting the formatted objects to the client application as the requested report content of the selected report.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 4 is a block diagram showing an embodiment of a web service interface of the report web service system;

FIG. 5 is a block diagram showing an embodiment of a selector of the report web service system;

FIG. 6 is a block diagram showing an embodiment of a presentation formatter of the report web service system;

FIG. 15 is a diagram showing an example of XML for the portal folder.

DETAILED DESCRIPTION OF PREFERRED EMBODIMENTS

Figure 1:
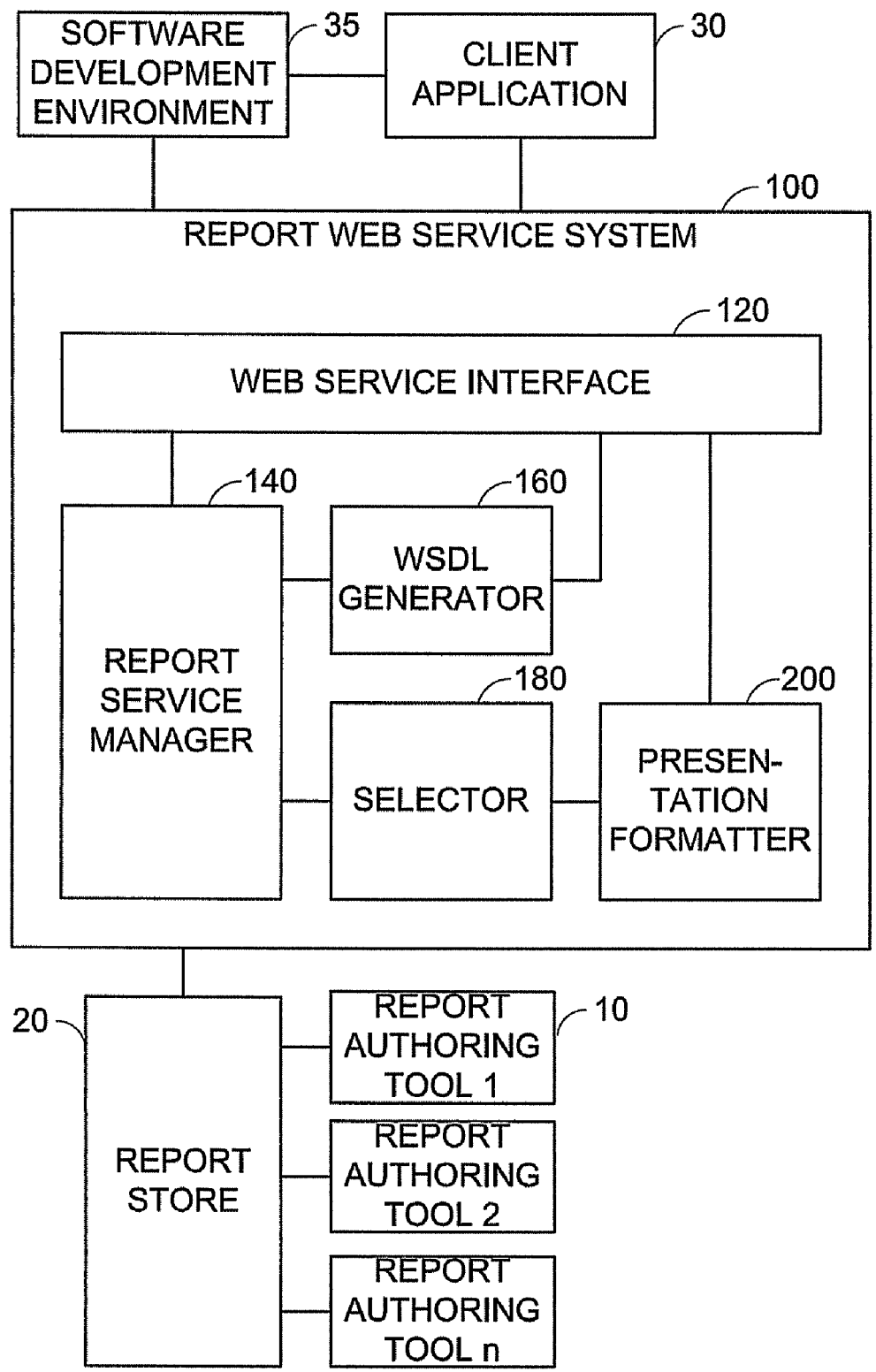
FIG. 1 is a block diagram showing a report web service system in accordance with an embodiment of the present invention.

FIG. 1 shows a report web service system 100 in accordance with an embodiment of the present invention. Report authors create reports using various report authoring tools 10 and store the report in a report store 20. A report is a specification that contains queries for obtaining desired data from one or more underlying data sources, layout information for presenting the obtained data in a certain manner, and other information relating to the report. The report web service system 100 provides the reports as web services to a web service client application 30.

Web services use a standardized way of communication between web-based applications over an Internet protocol backbone. Thus, the report web service system 100 facilitates easy programmatic access to the reports by web service consumers from any programming environment.

In this embodiment, the report web service system 100 has a web service interface 120, a report service manager 140, a Web Services Description Language (WSDL) generator 160, a selector 180 and a presentation formatter 200.

There are two phases in which the report web service system 100 is used. In the first phase, an application developer develops his/her own client application 30 in a software development environment 35 based on the reports provided as web services by the report web service system 100. In the second phase, a user runs the developed client application 30 which makes web service operation requests (as defined in the WSDL) on the web services provided by the report web service system 100.

Figure 2:
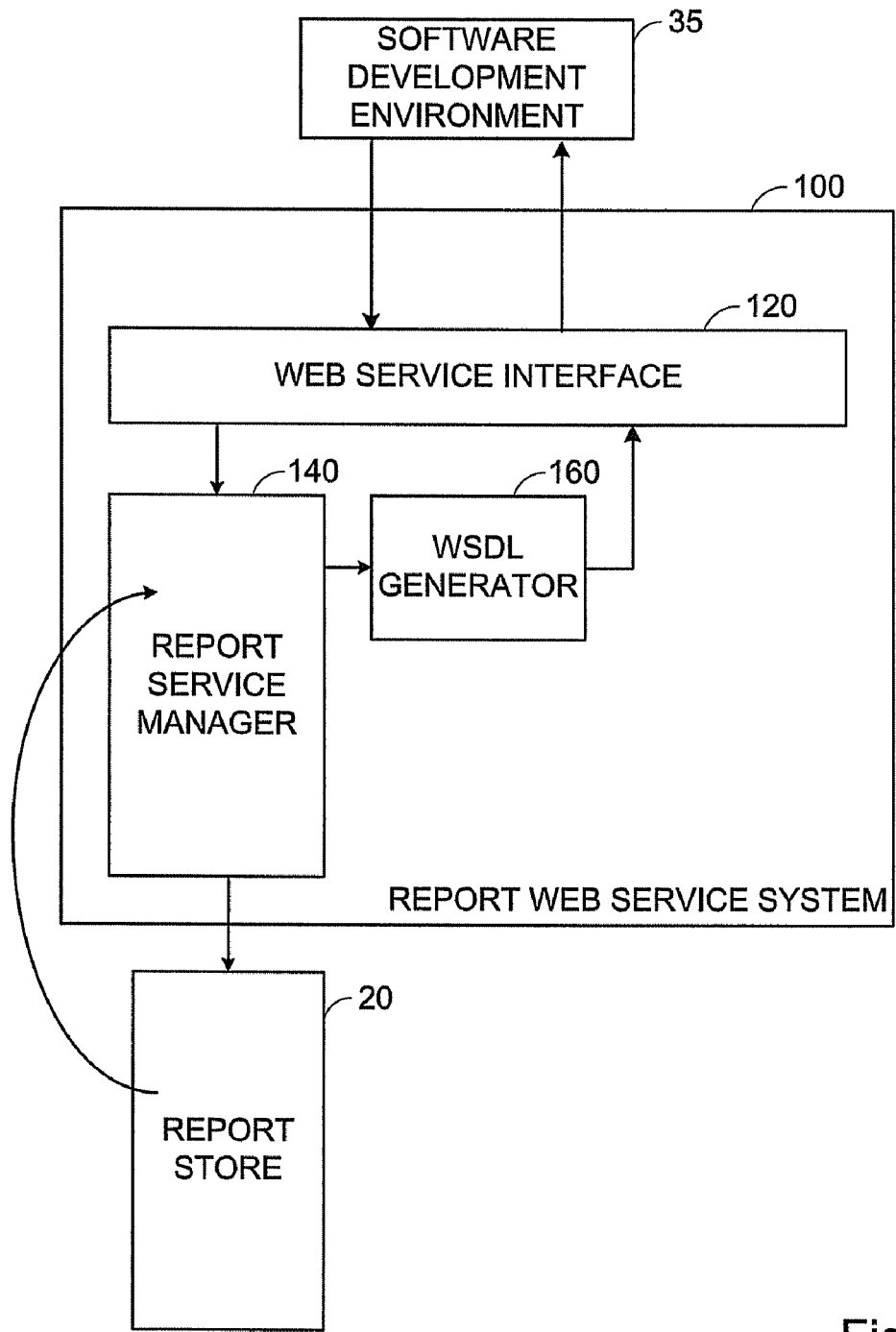
FIG. 2 is a diagram showing a request and data flow in a client application development phase, which integrates a report web service definition.

FIG. 2 schematically shows the flow of requests or data during the client application developing phase. In this phase, the report web service system 100 provides, as a web service, a mechanism to model the objects that a report author has included in a report stored in the report store 20. The structure of the web service report provided by the report web service system 100 represents the semantics of the objects, and thus, makes it easy for the report developer to understand the semantics of the information included in the report, and to easily reference information in the report output.

The web service interface 120 receives from a software development environment 35 a request for a web service description for a report web service. The web service interface 120 can handle requests in multiple standard protocols for a web service. The web service interface 120 extracts the request information from the protocol specific format, and maps it into a protocol independent format. The web service interface 120 passes the protocol independent formatted request to the report service manger 140.

The report service manager 140 obtains from the report store 20 definitions of one or more objects of a requested report, and converts them into web service definitions. The report service manager 140 generates an object model that represents a common schema of the objects based on the web service definitions of the objects. The generated object model reflects the layout of the objects in the report as the report author created and other information, e.g., authored report object names, parameters, queries and drill paths, as further described below.

The WSDL generator 160 generates a WSDL description or definition based on the object model, and provides the WSDL description to the web service interface 120. The WSDL description describes the operations that the web service supports and the structured response types of these operations, which are generated, based on the generated object model.

The web service interface 120 receives the WSDL description from the WSDL generator 160, and transports it to the software development environment 35 as a response to the request, in the same protocol in which the request was received.

Thus, the report web service system 100 can automatically create a unique report web service definition for each report, based on the report definition including the report specification as authored by the report author.

Figure 3:
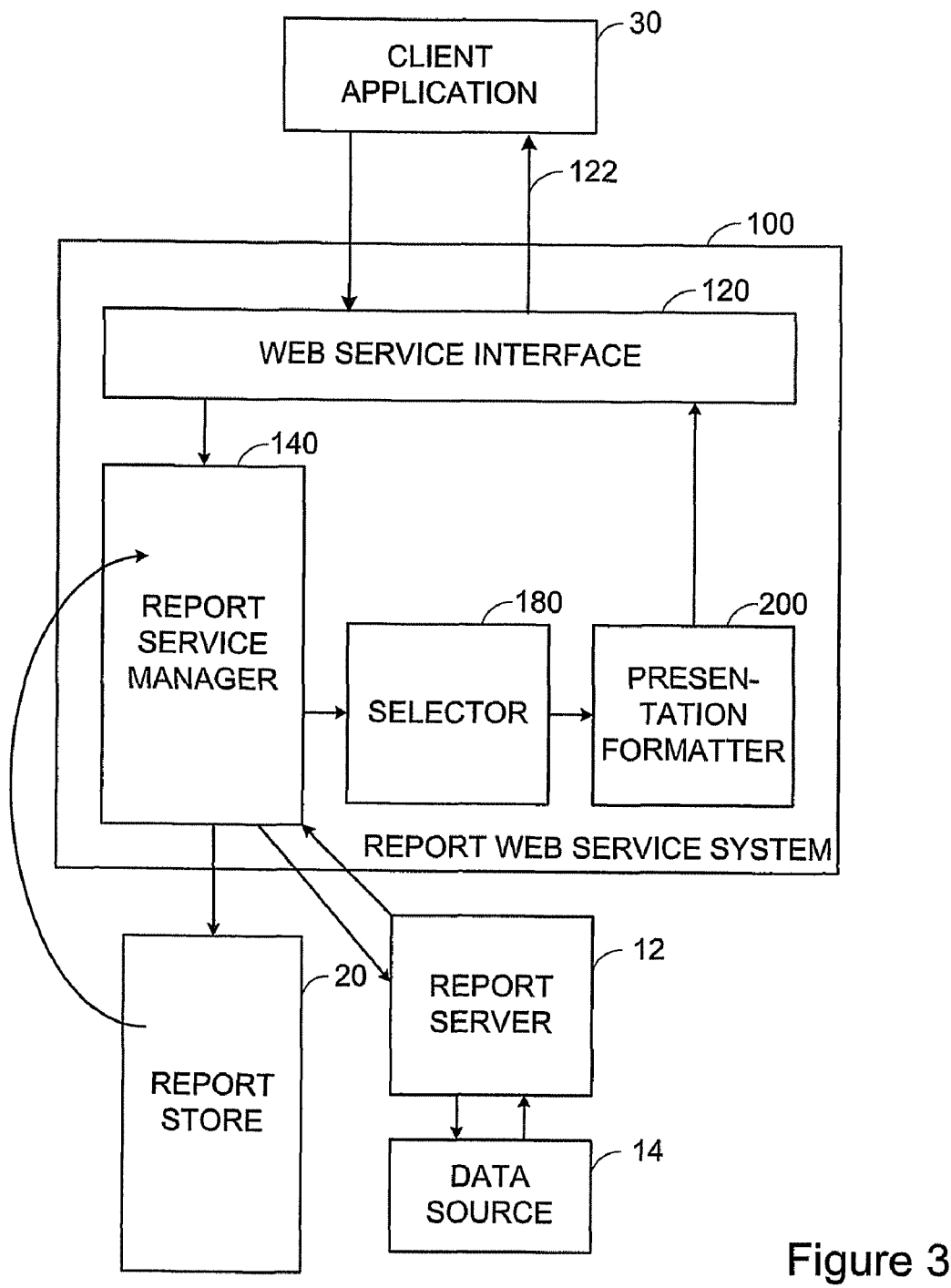
FIG. 3 is a diagram showing a request and data flow in a client application execution phase.

FIG. 3 schematically shows the flow of requests or data during application client 30 execution phase. In this phase, the report web service system 100 executes a report web service as requested by client application 30, using the information in the web service definition as developed by the client application developer.

The web service interface 120 receives from the client application 30 a request to run a selected report. The web service interface 120 can handle requests in multiple standard protocols for web services, such as Simple Object Access Protocol (SOAP), REST, HTTP/XML, JSON, etc. The web service interface 120 extracts the request information from the protocol specific format, and maps it into a protocol independent format. The web service interface 120 passes the protocol independent formatted request to the report service manger 140

The report service manager 140 determines a relevant report server 12 based on the received request and which report authoring tool 10 was used for the requested report, and requests to the report server 12 to render the selected report to obtain format, layout and desired data, from the underlying data source or sources 14. The report service manager 140 receives the report render results including the desired data from the report server 12 in a format specific to the relevant report server 12, and converts them into common generalized structured model of a report artifact. The generalized model of a particular report is same as the object model generated for the particular report during the client application developing phase described above.

The selector 180 receives the generalized model of the report results from the report service manager 140, and selection filter specifications from the protocol independent formatted request. The selector 180 selects just the relevant objects (based on the selection filter) in the generalized model of the report results, to form a filtered selection of the results.

The representation formatter 200 receives the filtered generalized model of the report results from the selector 180, and formats the presentation of objects in the model based on the requested format from the protocol independent formatted request.

The web service interface 120 receives the formatted model of the report results from the representation formatter 200, and transports it to the client application 30 as a response to the request, in the same protocol in which the request was received.

Thus, data that appears in the resultant report output is presented to the report consumer through the client application 30, being laid out in a manner that it is easy for the report consumer to understand. For example, in visual layouts of a report output, aggregate values appear in group footers, or list footers. These visual aids help a report consumer "navigate" the data and easily understand the semantics or meaning of the data based on where it appears.

Similarly, the report service manager 140 also builds some semantics of the data into the object model, so that it structures the report web service to capture this layout structure, to make it easy to reference exactly the data that the programmer requires. For example, a list object has row objects which have child elements based on the column titles that name the data in the row. Another example is that list group objects have footer elements that match any group-level footers that are defined for the list object. The report service manager 140 builds the semantics at report execution request time. The semantic information is contained in the report definition, and the rendered result format received from the report servers 12. The report service manager 140 has a mapping, per report authoring tool 10/report server 12, of combining these two information sources to provide the normalized structured generic model of the report results.

In order to, support client application development with web services in a format best suited for any particular development environment/application needs, in an embodiment shown in FIG. 4, the web service interface 120 has a SOAP handler 122 for handling SOAP requests and transferring data, and a Representational State Transfer (REST) handler 124. Thus, the report web service system 100 can support both REST and SOAP messages that are compliant with the web service standards. Using these standards facilitates handling of the specific issues of popular vendor toolkits.

As shown in FIG. 5, the selector 180 has various selection filters, e.g., a no filter 182, an object ID filter 184, a context selector 186, and/or a XPath/XQuery handler 188. The object ID filter 184 filters objects in the generalized model based on the value of the object ID report objects. Similarly, the context selector 186 selects the context based on the data context of a report object (such as a crosstab cell, where the row header is "country=Canada" and the column header is "year=2004".) The XPath/XQuery handler 188 handles XML Path Language (XPath) or XQuery selection criteria. XPath is a language for selecting nodes from an XML document. XQuery is a query language that is designed to query collections of XML data (and includes XPath expressions).

By using these elements, the selector 180 can efficiently address/name/identify and select parts of the report, based on selection mechanisms including object name, Xpath/Xquery, cell query definition context, and the like. Thus, the report web service system 100 can provide web service access not only to the entire report, but also parts of the report.

As shown in FIG. 6, the representation formatter 200 may have multiple representation handlers, e.g., an XML handler 202, an HTML handler 204, an HTML fragment handler 206, an image handler 208, and/or a print-friendly format handler 210. These handlers 202-210 handle representations of the selected report in the respective format, i.e., XML, HTML, HTML fragments, images and PDF. The image handler 208 may handle various image formatting, e.g., PNG, JPEG and GIF. The print-friendly format handler 210 may handle various print-friendly formatting, e.g., PDF and XML-FO.

By using such representation formatter 200, the report web service system 100 can provide alternative representations of the requested report/report part though an efficient translation mechanism 202-210.

Figure 8:
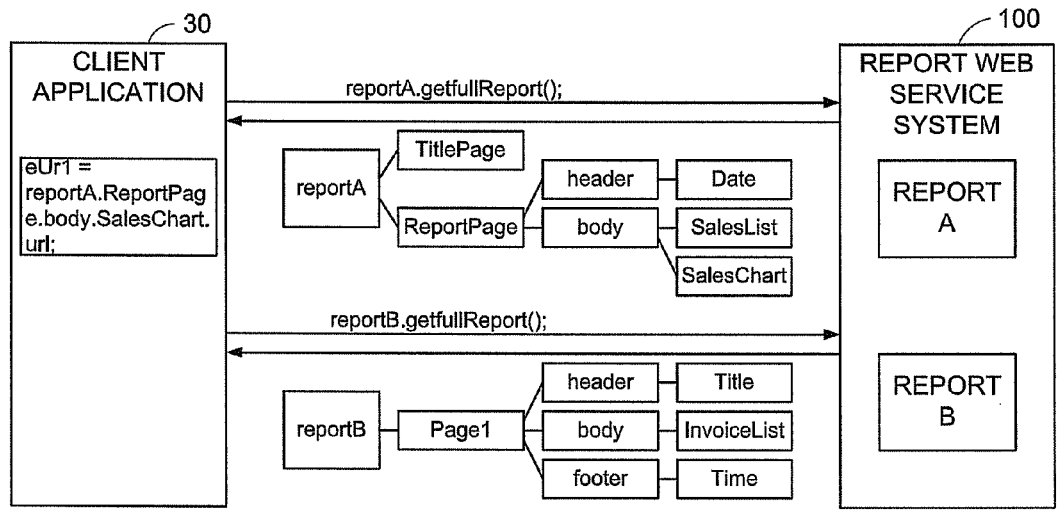
FIG. 8 is a diagram showing examples of report-specific web services with object models of reports.

FIG. 8 shows an example of providing Report A and Report B as web services. Each report or content source is represented by its own web service. In response to a request for a report A as a web service from the client application 30, the report web service system 100 provides the elements of the report A as structured and named by its report author. The response type for each report A, B is different with the actual elements that are in the report, making up the structure/names of the return type.

Figure 9:
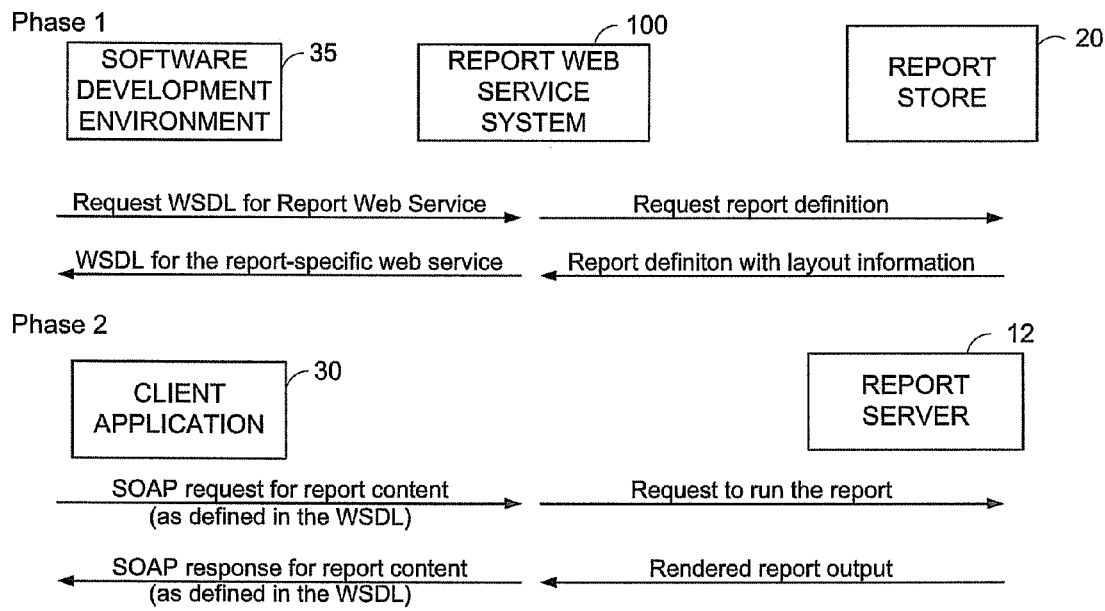
FIG. 9 is a diagram showing processes of web service processing.

FIG. 9 shows an example showing a request flow for a client application 30, to the report web service system 100, accessing a report-specific web service, for a report authored using an authoring tool of a report server 12.

During the client application developing phase (Phase 1), the software development environment 35 requests a WSDL definition for a selected report to the report web service system 100. The report web service system 100 requests layout information of the selected report to the report server 12. The report server 12 returns the report definition XML of the selected report to the report web service system 100. The report web service system 100 generates a WSDL definition and sends it to the client application 30.

During the client application execution phase (Phase 2), the client application (developed in Phase 1) issues a request for report content for a report as defined in the WSDL definition, and sends it to the report web service system 100. The report web service system 100 requests to run the report to the report server 12. The report server 12 returns the rendered report output to the report web service system 100. The report web service system 100 generates a SOAP response for the report content as defined in the WSDL, and transports it to the client application 30.

Figure 7:
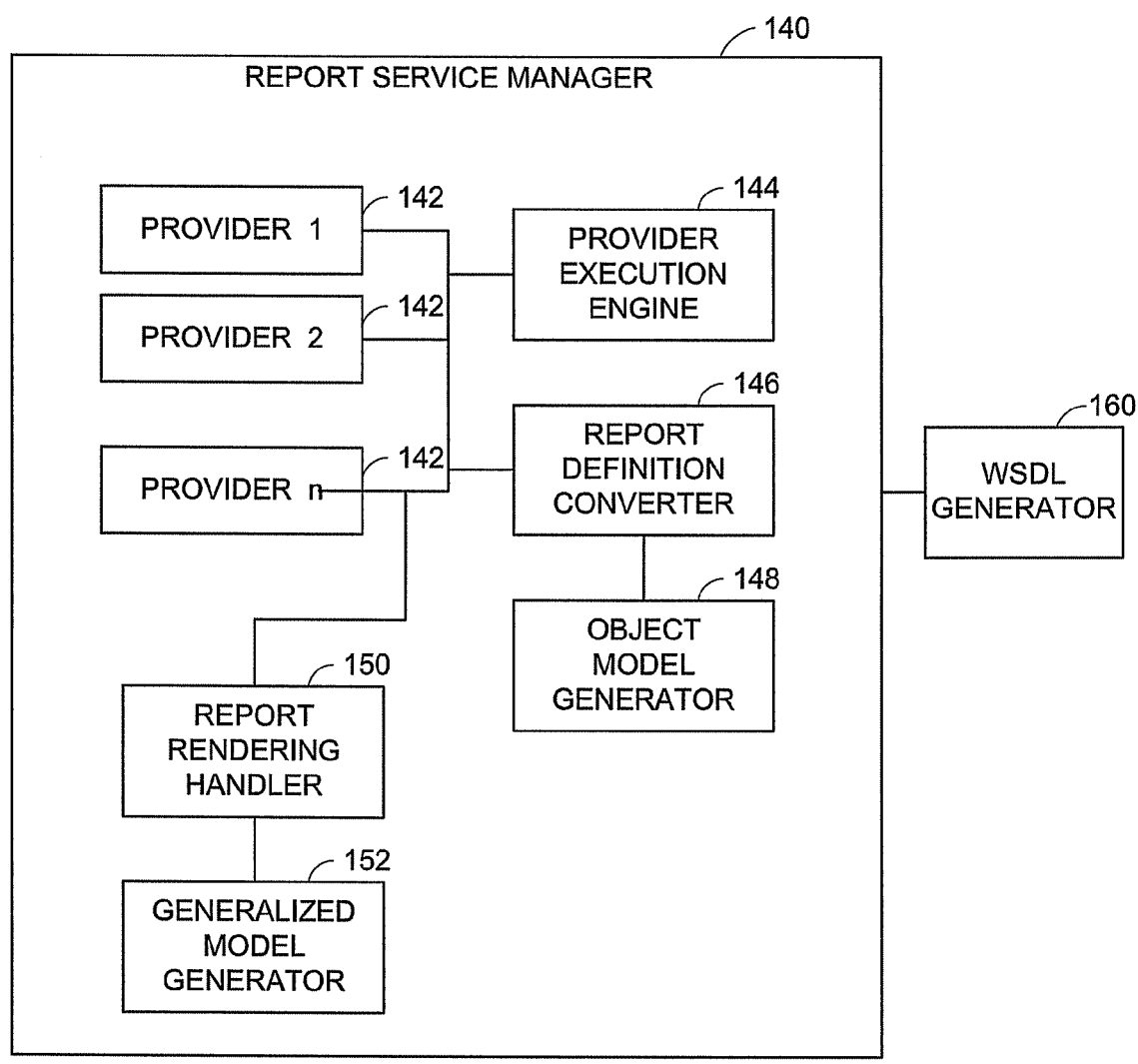
FIG. 7 is a block diagram showing an embodiment of a report service manager of the report web service system.

Referring now to FIG. 7, the report service manager 140 is further described. In this embodiment, the report service manager 140 has a plurality of providers 142, a provider execution engine/renderer 144, a report definition converter 146, an object model generator 148, a report rendering handler 150, and a generalized model generator 152.

Each provider 142 is associated with a report authoring tool and respective report server 12 and provides functions to communicate with the associated report server. The provider execution engine 144 controls execution of each provider. The report definition converter 146 converts the definitions of the objects in the report (which can have different formats for each provider) into a common generic report representation, not representing any provider report definition specifically. The object model generator 148 generates an object model based on the generic report representation definition of the objects. During the client application execution phase, the report rendering handler 150 requests rendering of the report by the corresponding report server through its associated provider, and receives rendered results including objects. The generalized model generator 152 generates a generalized model based on the objects of the rendered results.

The report definition converter 146 parses the report definitions into a common representation of the report definition. This is accomplished by having a mapping for each provider's report definition format, from the elements and containment hierarchy defined in the report definition, to a best representation of these elements in the common representation format. The object model generator 148 uses this common representation, to build an object model of the report's structure. The WSDL generator 160 builds a WSDL description of the web service that is created for this report from the object model. This is done by defining web service operations for each named report element object in the model, to support requests for specific parts of the report, as well as an operation for requesting the entire report. Information identifying the selector, and which object to select is encoded into the web service operation definition. During the client application execution phase, calls to the report part operations use this information to identify the selector to use, and identify the report object selected. The WSDL generator 160 also defines the request and response XML type definitions for each operation. This is done by mapping the objects and the object hierarchy in the object model, into XML types, using XML Schema Definition (XSD) language.

The report service manager 140 allows objects from the report to be referenced in whole (e.g., entire charts, lists) or in part (e.g., group headers and footers, specific text boxes, specific cell values).

The report service manager 140 structures the object model based on the objects that the report author has created, making it very easy to reference the object or cells within it. The object model also reflects the physical appearance or layout of objects (for example a list object) that are formatted to make it easy to visually understand the data (e.g., group footers containing aggregate values). This also makes it very easy to reference specific data in the report. The report web service typically represents all of the objects in the report. All attributes and available actions of the report objects (formatting information, unformatted cell values, data type, data source references, drill target information, etc.) are included as attributes of the represented objects.

This allows business logic (e.g., process workflows) to be defined which act upon the content of reports, allowing reports to truly become a "single version of the truth" (i.e. the business logic is acting on the exact same reports that people are looking at visually in the reporting portal).

The object model generated by the report service manager 140 significantly reduces the fragility of client apps consuming a report output, in the face of changes to the report objects and the contents of the query. Thus, the report web service system 100 makes it possible to use simple programming constructs and very intuitive code to reference and use all of or parts of a report.

The generalized model of a reporting artifact captures all the reporting application details (not just the query data) of the artifact, including layout information, style information (colors, fonts, borders, etc.), drill behaviors, etc. This information is structured in a manner to facilitate navigating and understanding the context of the parts of the report (e.g., a list cell).

Define a generalized object model of a reporting object or artifact and provide a "normalizing" role to know how to get artifacts from different underlying applications, and how to transform the artifacts into the generalized model. This has the advantage of simplifying the job of the consumer from having to understand/code to different underlying applications.

Figure 10:
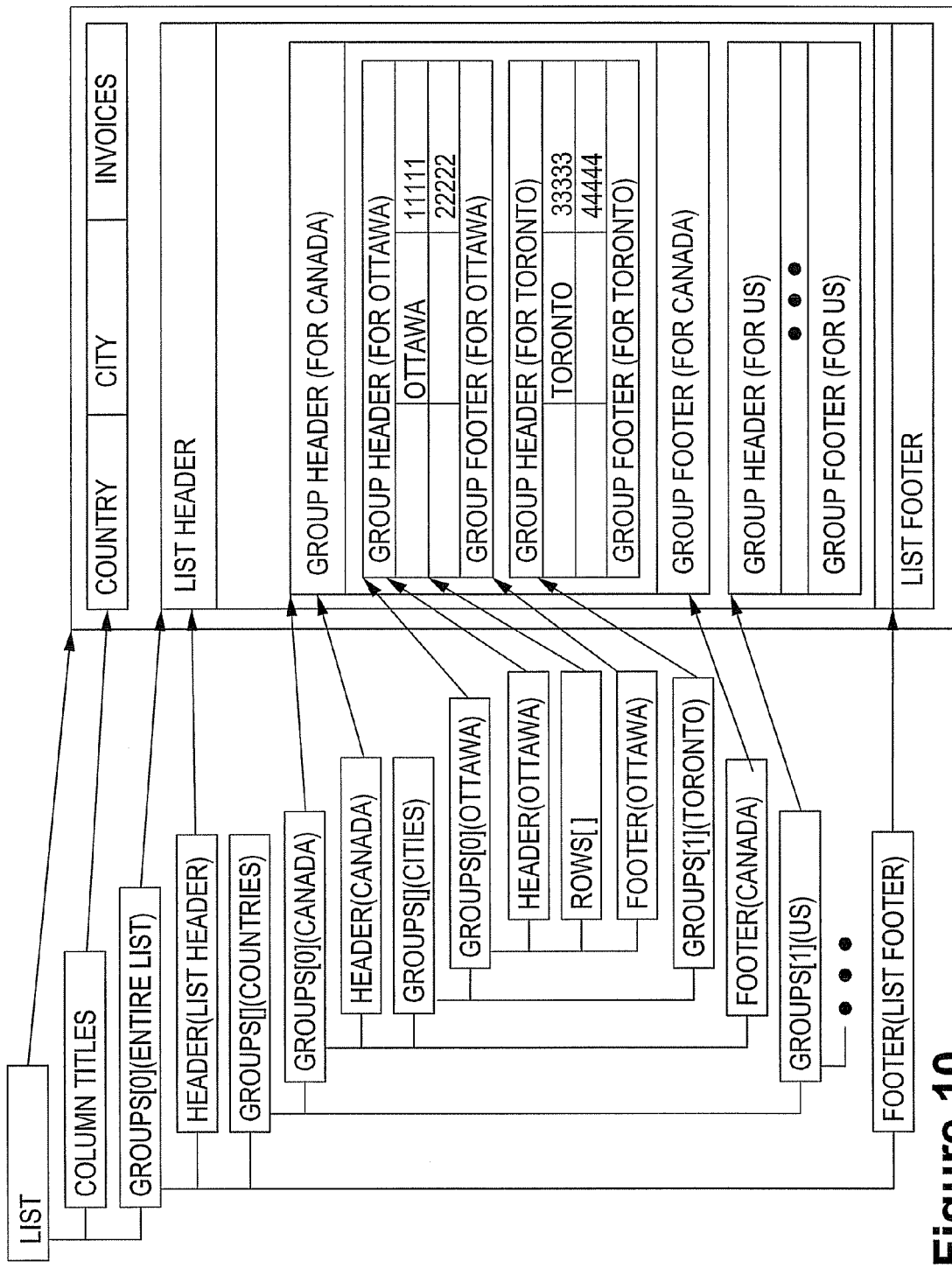
FIG. 10 is a diagram showing an example of an object model for a grouped list structure.

FIG. 10 shows an example of modeling a grouped list structure. In this example, the report service manager 140 generates an object model with definitions of List, Column Titles, Groups[0] (entire list), Headers (list header), Groups[ ] (countries), Groups[0] (Canada), Header (Canada), Groups[ ] (entities), Groups[0] (Ottawa), Header (Ottawa), Rows[ ], Footer (Ottawa), Groups[1] (Toronto), Footer (Canada), Groups[1] (US), . . . and Footer (lists footer). The structure of these objects in the model reflects the layout of the objects in the grouped list structure.

Figure 11:
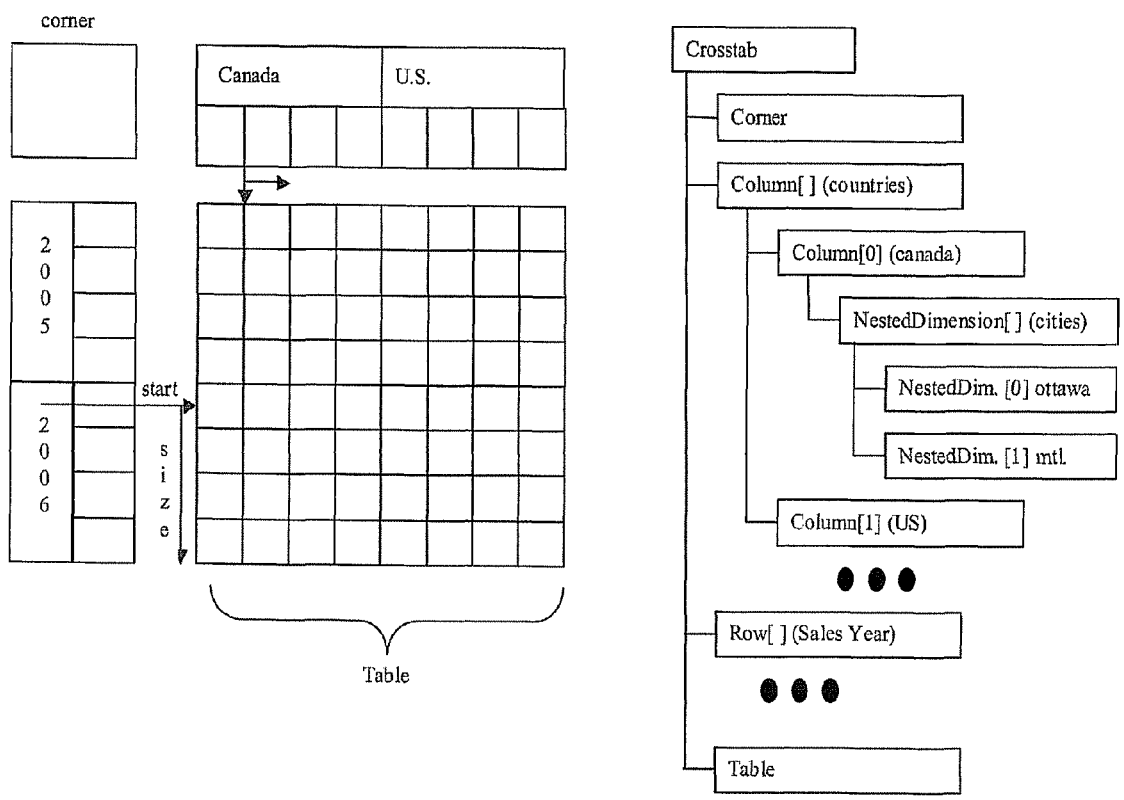
FIG. 11 is a diagram showing an example of an object model for a crosstab structure.

FIG. 11 shows an example of modeling a crosstab structure. In this example, the report service manager 140 generates an object model with definitions of Crosstab, Corner, Column[ ] (countries), Column[0] (canada), Nested Dimension [ ] (cities), NestedDim[0] ottawa, NestedDim[1] montreal, Column[1] (US), . . . and Row[ ] (Sales Year), . . . and so on. The structure of these objects in the model reflects the layout of the objects in the crosstab structure.

Thus, the report web service system 100 is capable of automatically creating a unique web service based on the report specification for various reports. The structure of the report web service given by the report web service system 100 provides for the simple programmatic reference to entire objects or pieces of objects, e.g., individual cells in a list, or indexing the columns in a crosstab. The report web service system 100 generates a web service with the structure that provides an object model based on the objects that the report author has created in the report, which allows a person viewing the report to see the structure visually. The report web service can follow the nesting structure of the report, which results in intuitive, easy to read client code.

Also, as the report web service system 100 programmatically represents all the attributes and behavior of a report in a client agnostic format, it makes it easy to do "alternate renderings" of reports (with high fidelity to the native reporting applications "look and feel" and behaviors) into new client environments (e.g., Mobile devices, Rich Interactive Application environments, desktop widget environments, mashup and composite application environments, etc.). These objects are the effective mechanism for programmatically using the report results. Some example usages include rendering the report in alternate formats (to view on a small screen device, or in other applications like Excel) or to find a specific cell value (to be used in the conditional flow of control in a business process engine).

Figure 12:
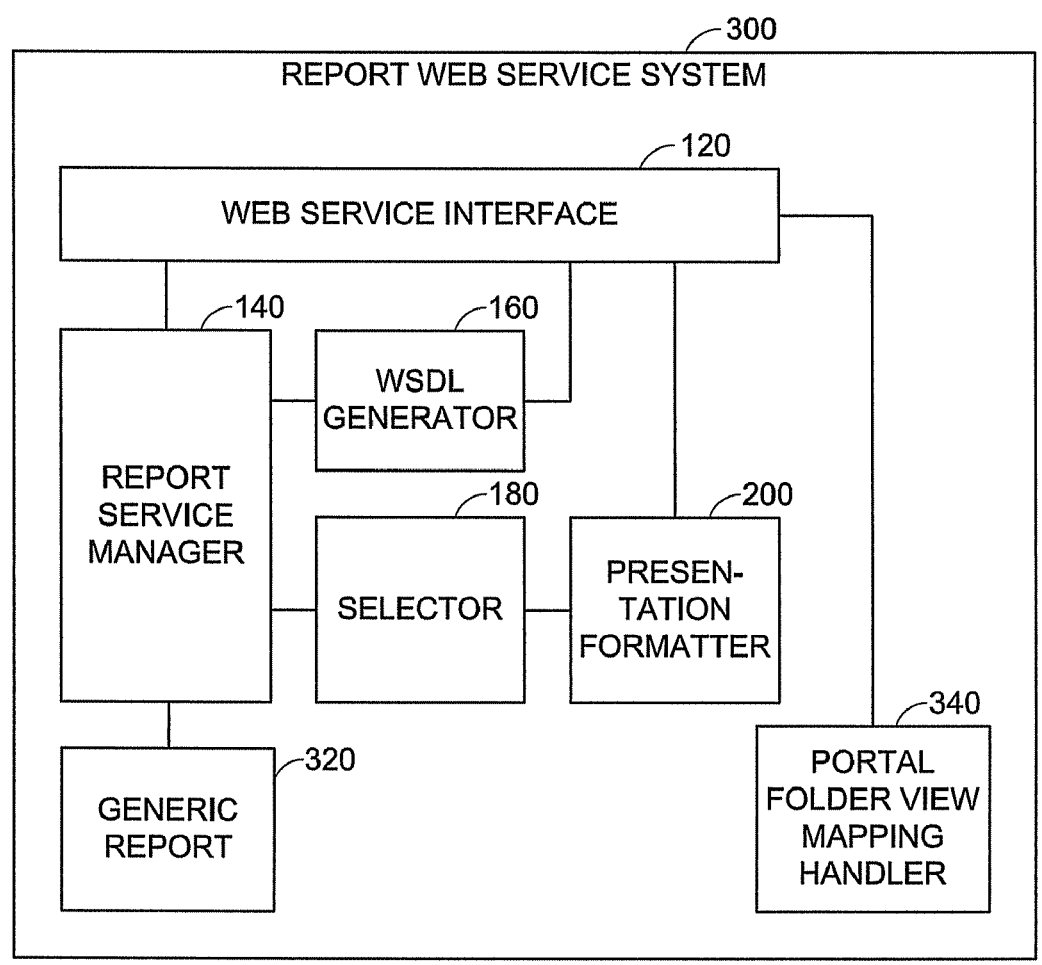
FIG. 12 is a block diagram showing a report web service system in accordance with another embodiment of the present invention.

FIG. 12 shows a report web service system 300 in accordance with another embodiment of the present invention. The report web service system 300 has a generic report 320, in addition to the components 120-200 as described above.

The report web service system 300 provide report web services in two modes. The first mode is a report-specific web service mode, in which the report service manager 140 generates a report-specific object model for each report authored by a report author, as described for the report web service system 100.

The second mode is a generic report web service mode, in which the report service manager 140 uses the generic report 320 and generates a generic or static object model that is generic enough to be applicable to all reports. Thus, the report web service system 300 provides a generic web service.

Figure 13:
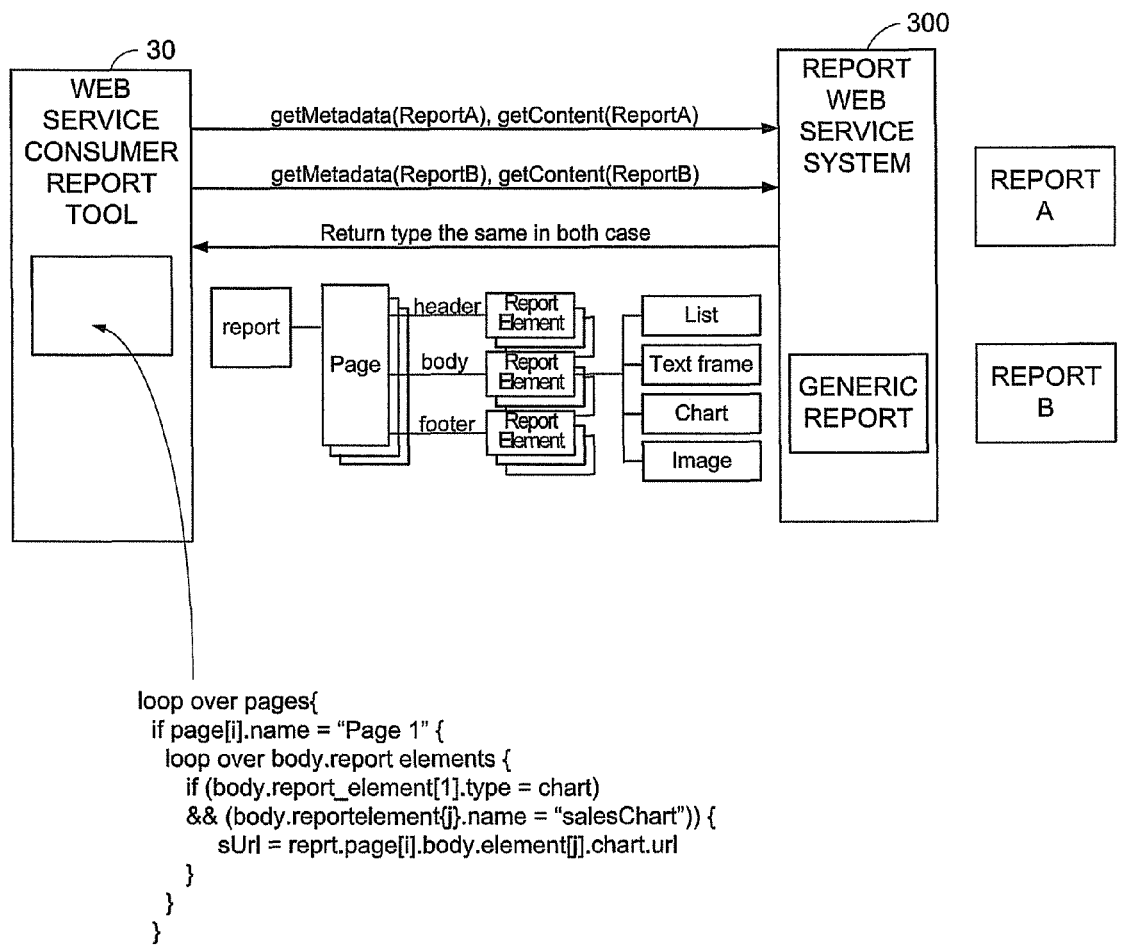
FIG. 13 is a diagram showing an example of a generic report web service with a generic object model.

The static nature of the generic service is that it is the same object model for any reports created by various report authoring tools. The generic object model represents a normalized view of a report document. An example of such a generic object model is shown in FIG. 13. In this example, the report is made up of a collection of pages, each page with a body, footer and header, containing collections of report elements, each report element may be a choice of the different report element types (e.g., a text frame, chart, list, crosstab, or image).

This generic report web service is useful for alternate rendering of a report, e.g., rendering a report for a mobile device, and suitable to use with reporting tools that want to generically be able to consume any reports. Also, this generic report web service is suitable for building general extension to the functions of an existing report authoring tool, e.g., where the client application report tool does not know about the structure of specific reports and want to work generically for all reports.

Thus, the report web service system 300 provides two distinct Report Web Service object models. One object model that gives priority to replicating the object structure of the report specification and yields a service that is more applicable for client applications that provide alternate renderings of the report. Another object model that simplifies the report structure, and gives priority to a simplified object structure that simplifies finding or referencing the report objects and data that is important to the Report Web Service client.

Because of the dynamic, implicit nature of the per-report web services and their number, it is preferable that the report web service system 100 provides an ability to navigate the collection of web services made available by the report web service system 100. Moreover, to allow a developer to logically be able to find services, based on the reporting portal folder organization they are already familiar with, a portal folder view mapping handler 340 is provided, as exemplified in FIG. 12.

The portal folder view mapping handler 340 models an organization of the per-report web services in a dynamically generated mapping of the portal folder view to a web service discovery mechanism (e.g., WS-inspection, DISCO, and ATOM), and allows discovery of these web services. Each folder either contains more folders, or "leaf node" reporting artifacts. For example, the portal folder view mapping handler 340 may use the WS-inspection XML dynamically created, which generates a web service reference for all "leaf node" report artifacts, and generates a reference to another recursive WS-inspection resource, for the contained folder. Thus, a web service consumer can inspect a top-level root entry, which is dynamically generated, discover document for a given server, and be able to recursively navigate down to the web service of the reporting artifact of interest.

Figure 14:
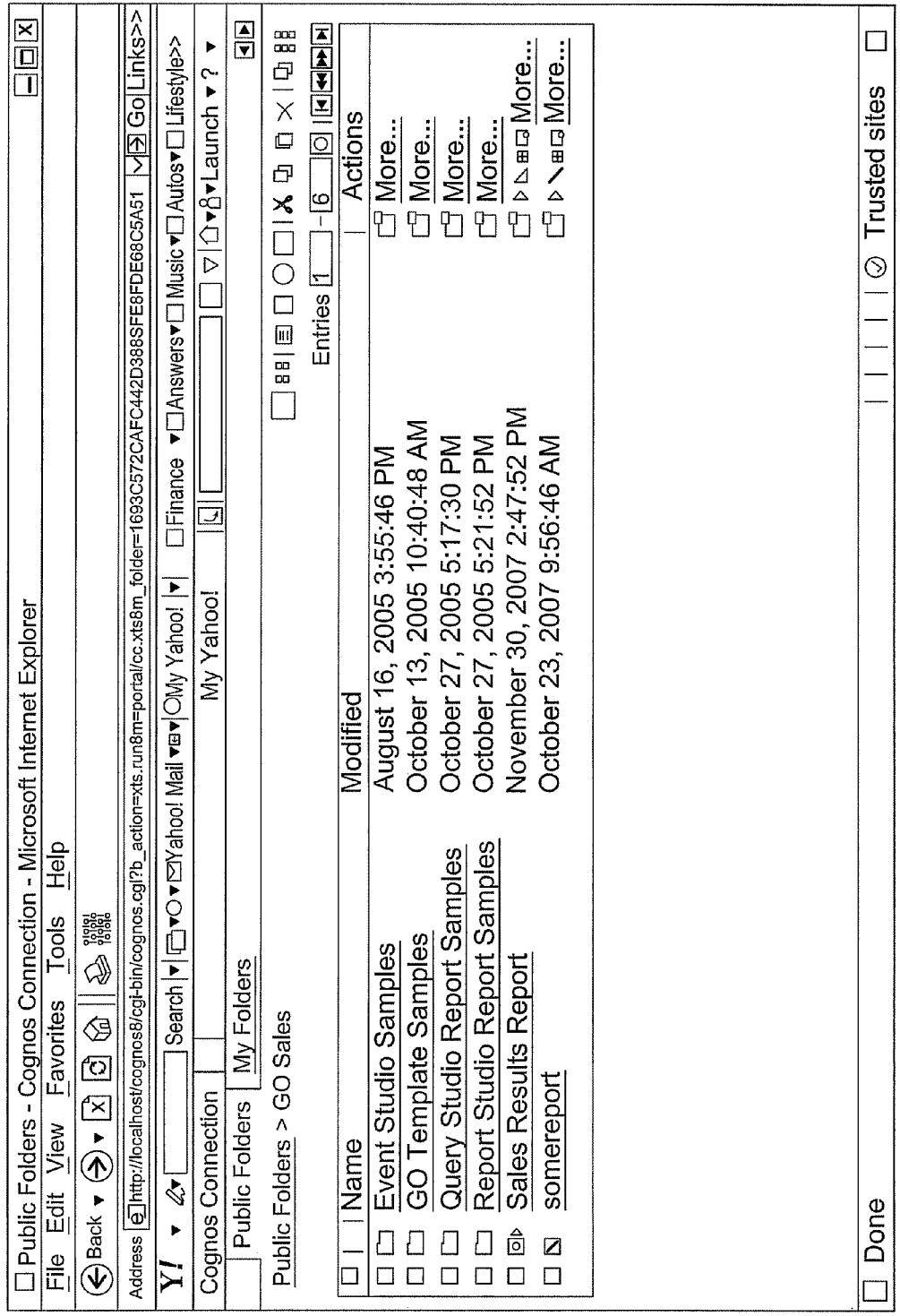
FIG. 14 is a screen shot showing an example of a portal folder view.

As an example, for the Cognos Connection™ folder, the report web service system 100 may provide a portal folder view as shown in FIG. 14. The report web service system 100 may dynamically generate a WS-inspection XML as shown in FIG. 15.

The report web service system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the report web service system are described separately, however, two or more elements may be provided as a single element, or one or more elements may be shared with other components in one or more computer systems.

What is claimed is:

1. A report web service system comprising:
   hardware; and
   instructions, stored in a memory, and which are executed by the hardware to implement:
   a web service interface for receiving from a client application a request for a web service definition for a report as a web service, and transporting to the client application the requested web service definition;
   a report service manager for converting definitions of one or more objects in a report in a report store that corresponds to the requested report into web service definitions, and generating an object model based on the web service definitions to reflect a structure of the objects of the report; and
   a Web Services Description Language (WSDL) generator for generating a WSDL definition of the web service based on the object model, and providing the WSDL definition to the web service interface for transporting the WSDL definition to the client application.

2. The report web service system as claimed in claim 1, wherein
   the web service interface receives from the client application a request for rendering a selected report as defined by a WSDL definition, and transports a report content of the selected report to the client application;
   the report service manager requests rendering of the selected report, receives rendered results, and generates a generalized model of the rendered results;
   the report web service system further comprises:
   a selector for selecting relevant objects from the generalized model based on information in the WSDL definition; and
   a representation formatter for formatting representation of the relevant objects and for providing a formatted objects to the web service interface to return to the client application as the requested report content of the selected report.

3. The report web service system as recited in claim 1, wherein the web service interface comprises:
   a Simple Object Access Protocol (SOAP) handler for handling SOAP requests and transfer of data; and
   a Representational State Transfer (REST) handler for handling data transfer in a large scale.

4. The report web service system as recited in claim 2, wherein the selector comprises a plurality of filters including one or more of:
   an object ID filter for filtering objects based on a value of an object ID;
   a context selector for selecting objects based on context of the objects; and
   a XPath/XQuery handler for filtering based on a path or query defined in the selected report.

5. The report web service system as recited in claim 2, wherein the presentation formatter comprises a plurality of formatters including one or more of:
- an Extensible Markup Language (XML) handler for handling formatting in XML;
- a Hypertext Markup Language (HTML) handler for handling formatting in HTML;
- a HTML fragment handler for handling formatting of HTML fragments;
- an image handler for handling formatting into in image format; and
- a print-friendly format handler for handling formatting to a print-friendly format.

6. The report web service system as recited in claim 1, wherein the report service manager comprises:
- a plurality of providers, each corresponding to an associated report authoring tool by which a report is authored and being capable of obtaining definitions of objects in the report;
- a provider execution engine for controlling execution of each provider;
- a report definition converter for converting the definitions of the objects in the report into web service definitions; and
- an object model generator for generating an object model based on the web service definitions of the objects.

7. The report web service system as recited in claim 6, wherein
- the report definition converter converts the definitions of the objects by mapping a report definition format of each provider, from elements and containment hierarchy defined in the report definition, to a representation of the elements in a common representation format; and
- the object model generator generates the object model using the common representation format.

8. The report web service system as recited in claim 7, wherein the WSDL generator generates the WSDL definition by defining web service operations for each named report element object in the object mode.

9. The report web service system as recited in claim 2, wherein the report service manager comprises:
- a plurality of providers, each corresponding to an associated report server by which the selected report is renderable;
- a report rendering handler for requesting rendering of the selected report by the report server through the associated provider, and receiving rendered results including objects;
- a generalized model generator for generating a generalized model based on the objects of the rendered results.

10. The report web service system as recited in claim 2, wherein
- the WSDL definition includes definition of web service operations for each named report element object in the mode; and
- the selector selects the relevant objects by issuing calls to report part operations based on the web service operations defined in the WSDL definition.

11. The report web service system as recited in claim 1 further comprising a generic report,
wherein the report service manager generates a generic object model based on the generic report, the generic object model representing a normalized view of a report document.

12. The report web service system as recited in claim 1 further comprising a portal folder view mapping handler for modeling an organization of per-report web services in a dynamically generated mapping of a portal folder view to a web service discovery mechanism of the client application.

13. A method of managing report web services, the method comprising the steps of:
- receiving from a client application a request for a web service definition for a report as a web service;
- converting definitions of one or more objects in a report definition in a report store that corresponds to the requested report into web service definitions;
- generating an object model based on the web service definitions to reflect a structure of the objects of the report;
- generating a Web Services Description Language (WSDL) definition for the web service based on the object model; and
- transporting the WSDL definition to the client application.

14. The method as claimed in claim 13 further comprising the steps of:
- receiving from the client application a request for rendering a selected report as defined by the WSDL definition;
- requesting rendering of the selected report;
- receiving rendered results;
- generates a generalized model of the rendered results;
- selecting relevant objects from the generalized model based on information in the WSDL definition;
- formatting representation of the relevant objects; and
- transporting the formatted objects to the client application as the requested report content of the selected report.

15. The method as recited in claim 14, wherein the selecting step comprises one or more of the steps of:
- filtering objects based on a value of an object ID;
- selecting objects based on context of the objects; and
- filtering based on a XPath or XQuery defined in the selected report.

16. The method as recited in claim 14, wherein the formatting step comprises one of the steps of:
- formatting the relevant objects in Extensible Markup Language (XML);
- formatting the relevant objects in Hypertext Markup Language (HTML);
- formatting the relevant objects in HTML fragments;
- formatting the relevant objects in images; and
- formatting the relevant objects in a print-friendly format.

17. The method as recited in claim 13, wherein the converting step comprises the steps of:
- selecting a provider that corresponds to an associated report authoring tool by which a report is authored, and obtaining definitions of objects in the report through the selected provider;
- converting the definitions of objects in the report in to web service definitions using the selected provider; and
- generating an object model based on the web service definitions of the objects.

18. The method as recited in claim 17, wherein
- the converting step converts the definitions of the objects by mapping a report definition format of each provider, from elements and containment hierarchy defined in the report definition, to a representation of the elements in a common representation format; and
- the object model generating step generates the object model using the common representation format.

19. The method as recited in claim 18, wherein the WSDL generating step generates the WSDL definition by defining web service operations for each named report element object in the object mode.

20. The method as recited in claim 14, wherein the converting step comprises the steps of:

selecting a provider that corresponds to an associated report server by which the selected report is renderable;

requesting rendering of the selected report by the report server through the associated provider;

receiving rendered results including objects;

generating a generalized model based on the objects of the rendered results.

21. The method as recited in claim 14, wherein the WSDL definition includes definition of web service operations for each named report element object in the mode; and the selecting step selects the relevant objects by issuing calls to report part operations based on the web service operations defined in the WSDL definition.

22. The method as recited in claim 13 further comprising the steps of:

retrieving definitions of objects in a generic report;

generating a generic object model based on the generic report, the generic object model representing a normalized view of a report document.

23. The method as recited in claim 13 further comprising the step of modeling an organization of per-report web services in a dynamically generated mapping of a portal folder view to a web service discovery mechanism of the client application.

24. A non-transitory computer readable medium storing instructions or statements for use in the execution in a computer of a method of managing report web services, the method comprising the steps of:

receiving from a client application a request for a web service definition for a report as a web service;

converting definitions of one or more objects in a report in a report store that corresponds to the requested report into web service definitions;

generating an object model based on the web service definitions to reflect a structure of the objects of the report;

generating a Web Services Description Language (WSDL) definition for the web service based on the object model; and transporting the WSDL definition to the client application.

25. The computer readable medium as claimed in claim 24, wherein the method further comprises the steps of:

receiving from the client application a request for rendering a selected report as defined by the WSDL definition;

requesting rendering of the selected report;

receiving rendered results;

generates a generalized model of the rendered results;

selecting relevant objects from the generalized model based on information in the WSDL definition;

formatting representation of the relevant objects; and transporting the formatted objects to the client application as the requested report content of the selected report.

* * * * *